United States Patent [19]

Smith et al.

[11] Patent Number: 5,305,486
[45] Date of Patent: Apr. 26, 1994

[54] VEHICLE PASSENGER BOARDING SYSTEM

[75] Inventors: Ronald E. Smith, Glendale; Miles H. Kennington, Phoenix, both of Ariz.

[73] Assignee: Wheelers Manufacturing, Inc., Glendale, Ariz.

[21] Appl. No.: 80,539

[22] Filed: Jun. 24, 1993

[51] Int. Cl.⁵ .............................. A61G 3/06; B60P 1/00
[52] U.S. Cl. ........................................ 14/69.5; 14/70; 414/522; 414/921
[58] Field of Search ................ 14/69.5, 70.71.1, 71.3, 14/71.5, 72.5; 414/522, 537, 921; 296/61; 224/42, 44; D34/32

[56] References Cited

U.S. PATENT DOCUMENTS

| 4,718,812 | 1/1988 | Smalley et al. | 14/69.5 X |
| 4,759,682 | 7/1988 | Hood | 14/71.1 X |
| 4,827,548 | 5/1989 | Hood | 14/71.1 |
| 4,950,123 | 8/1990 | Brockhaus | 414/522 |
| 5,160,236 | 11/1992 | Redding et al. | 14/71.1 X |

Primary Examiner—Ramon S. Britts
Assistant Examiner—James A. Lisehora
Attorney, Agent, or Firm—Cahill, Sutton & Thomas

[57] ABSTRACT

A ramp stowable beneath the floor of a vehicle is normally power driven between retracted and extended positions. The drive, or propelling, mechanism for the ramp provides for the ramp to be manually disconnected from the propelling mechanism for manual extension and retraction in the event of a power failure in the system.

9 Claims, 4 Drawing Sheets

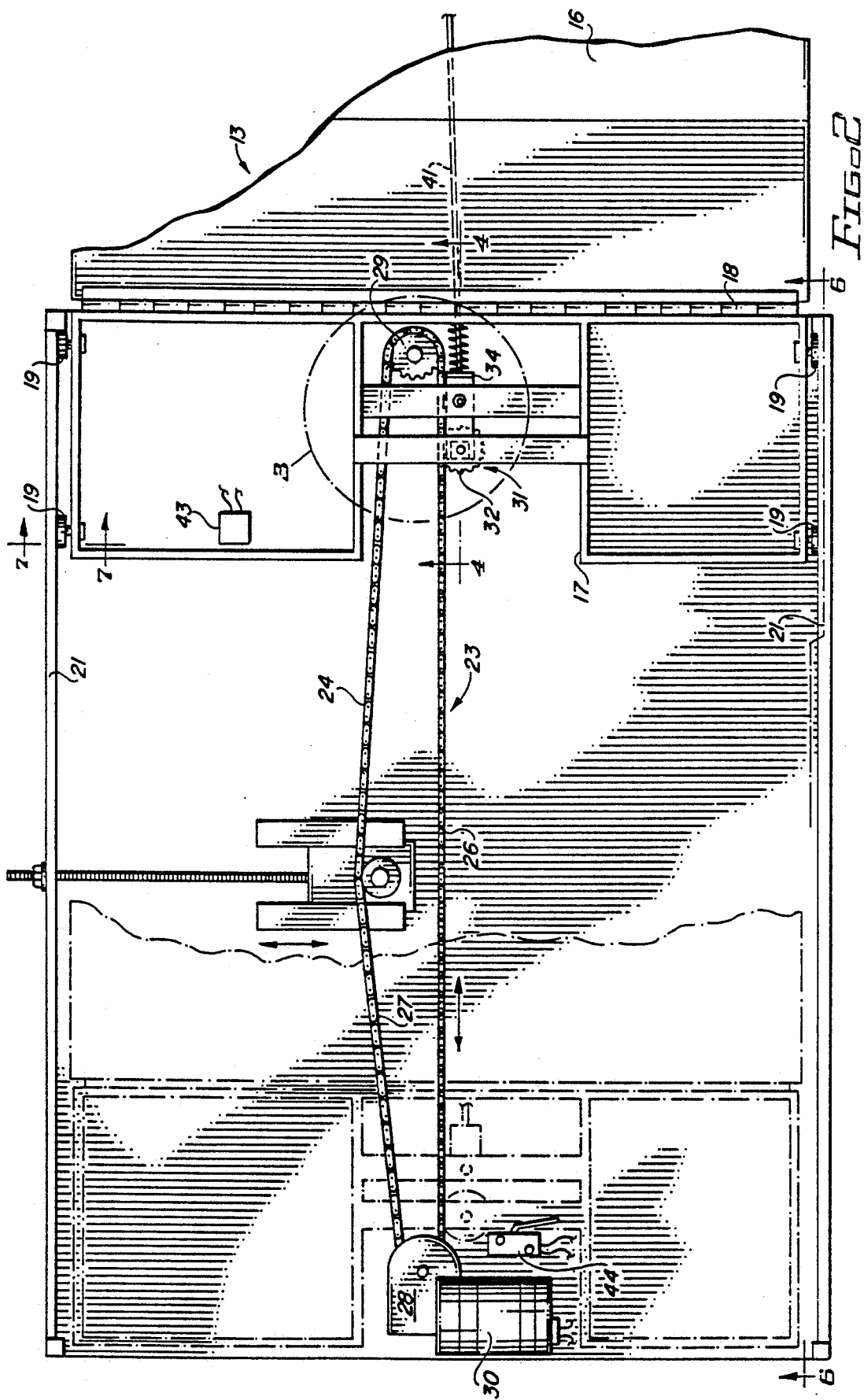

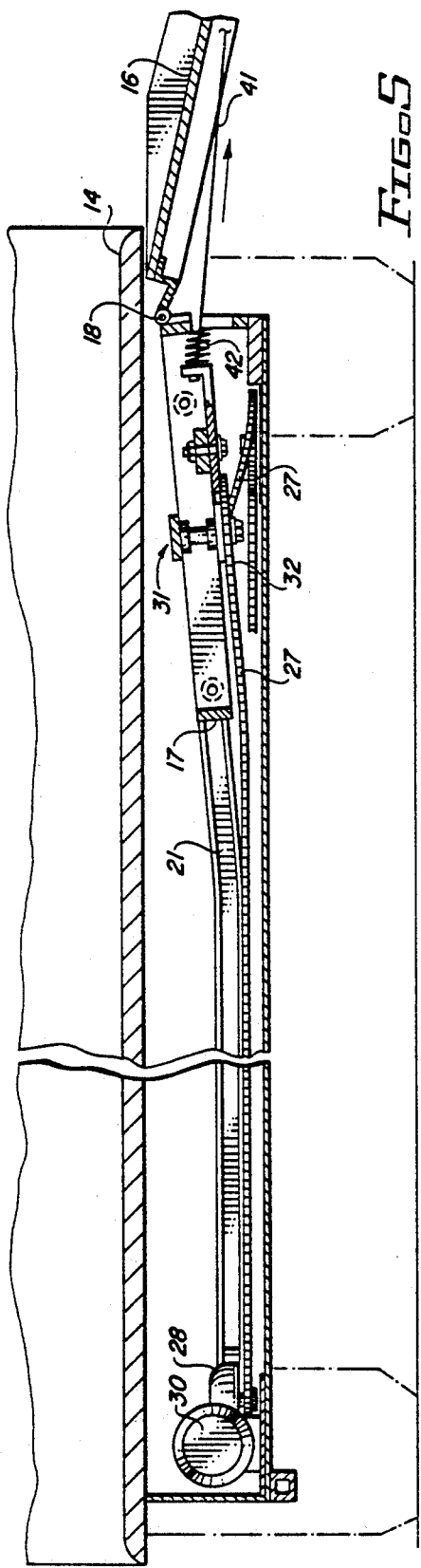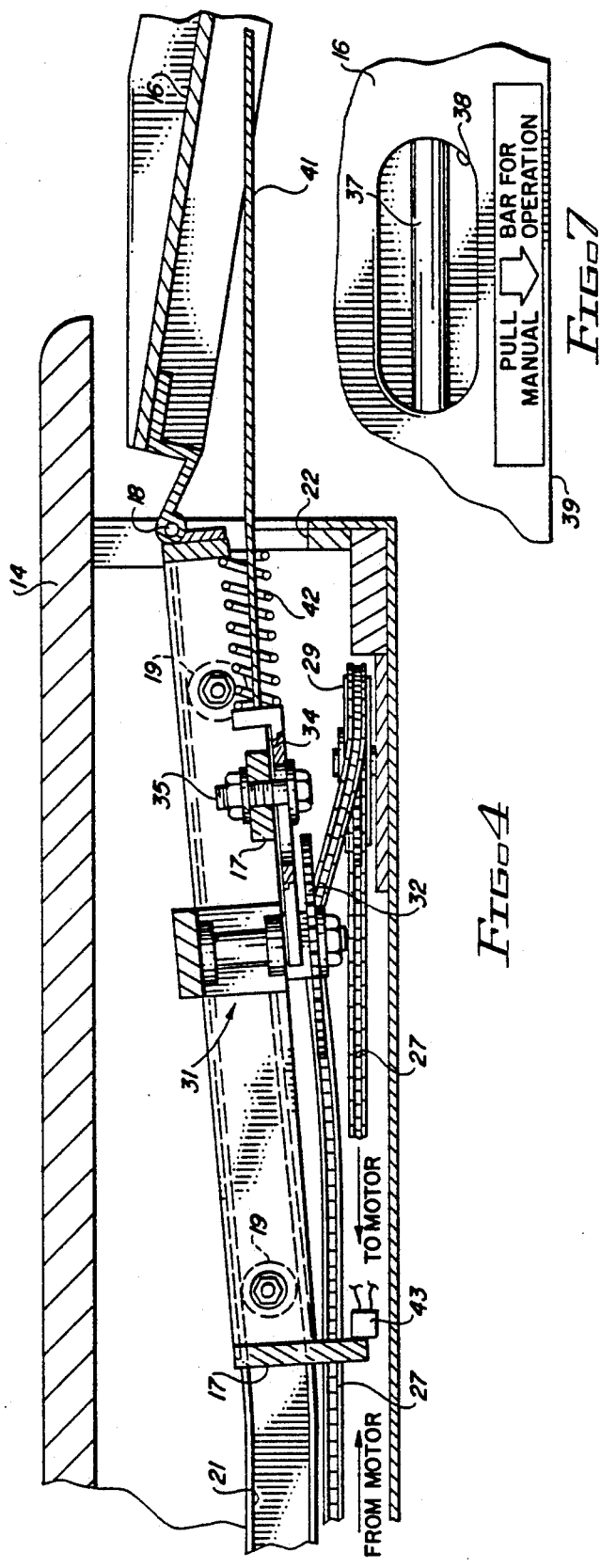

VEHICLE PASSENGER BOARDING SYSTEM

TECHNICAL FIELD

This invention is concerned with retractable ramp systems for facilitating entry and departure of handicapped persons into and out of a motor vehicle.

BACKGROUND ART

A number of prior inventors have devised retractable ramps which can be stowed beneath the floor of a motor vehicle and deployed through a door opening to provide a slightly inclined surface extending from the pavement to the vehicle floor. Such ramps greatly facilitate the entry into the vehicle of a wheelchair-bound person. These ramps are usually extended and retracted by a motorized drive system powered from the vehicle's electrical system.

One such ramp system which has had reasonable commercial acceptance is disclosed in United States Patent No. 4,827,548, granted May 9, 1989, to Delos W. Hood for "Vehicle Entrance Ramp". A significant shortcoming of this particular ramp system is the absence of any mechanism permitting manual deployment and stowage of the ramp in the event of a power failure or failure of the motorized drive system.

Interestingly, this same inventor, Mr. Hood, earlier devised a different ramp structure which did incorporate a releasable connecting mechanism to permit the ramp to be manually moved independently of the motorized drive. U.S. Pat. No. 4,759,682, granted Jul. 26, 1988, for "Vehicle Entrance Ramp" discloses this ramp structure. Unfortunately, the releasable connecting mechanism there disclosed appears to be cumbersome to operate. The mechanism itself is complex and is accessible for reconnection only with the ramp in its fully extended position. Thus, if the ramp has been manually stowed, it must be manually fully extended before powered operation can be resumed.

There continues to be a need for a retractable ramp system which can quickly and easily be converted from powered operation to manual operation and back to powered operation.

DISCLOSURE OF THE INVENTION

This invention provides a ramp system in which the releasable connecting mechanism can be manipulated from the outer end of the ramp—a region of the ramp which is exposed to view and accessible regardless of the position of the ramp.

The ramp system of this invention further includes a motorized linear propelling mechanism having a run parallel to the path of travel of the ramp. The releasable connecting mechanism selectively connects and disconnects the ramp to and from the propelling mechanism for motorized and manual operation, respectively. The linear propelling mechanism preferably includes a chain band and the releasable connecting mechanism includes sprockets for interdigitating the links of the chain. One mode for carrying out the invention comprises a sprocket wheel carried by the ramp and having sprockets which mesh with the links of the chain. This mechanism further includes means for selectively (a) locking the sprocket wheel against rotation to connect the ramp to the chain, or (b) releasing the sprocket wheel for free rotation, permitting movement of the ramp independently of the chain. In another mode for carrying out the invention, the releasable connecting mechanism includes a fork, the tines of which function as sprockets to selectively engage and disengage the links of the chain.

BRIEF DESCRIPTION OF THE DRAWINGS

The invention is described in greater detail hereinafter by reference to the accompanying drawings, wherein:

FIG. 2 is a fragmentary plan view of the propelling mechanism for the retractable ramp of the invention; solid lines illustrate the ramp in its fully extended, or deployed, position; the dot and dash lines illustrate the ramp in its fully retracted, or stowed, position;

FIG. 4 is an enlarged vertical sectional view through the ramp system, taken generally as indicated by the line 4—4 in FIG. 2;

FIG. 5 is a vertical sectional view similar to FIG. 4, the disconnect mechanism manipulated to disconnect the ramp from the powered propelling mechanism;

FIG. 7 is a fragmentary view of the outer end region of the ramp housing means for manipulating the disconnect mechanism;

BEST MODE FOR CARRYING OUT THE INVENTION

Figure 1:
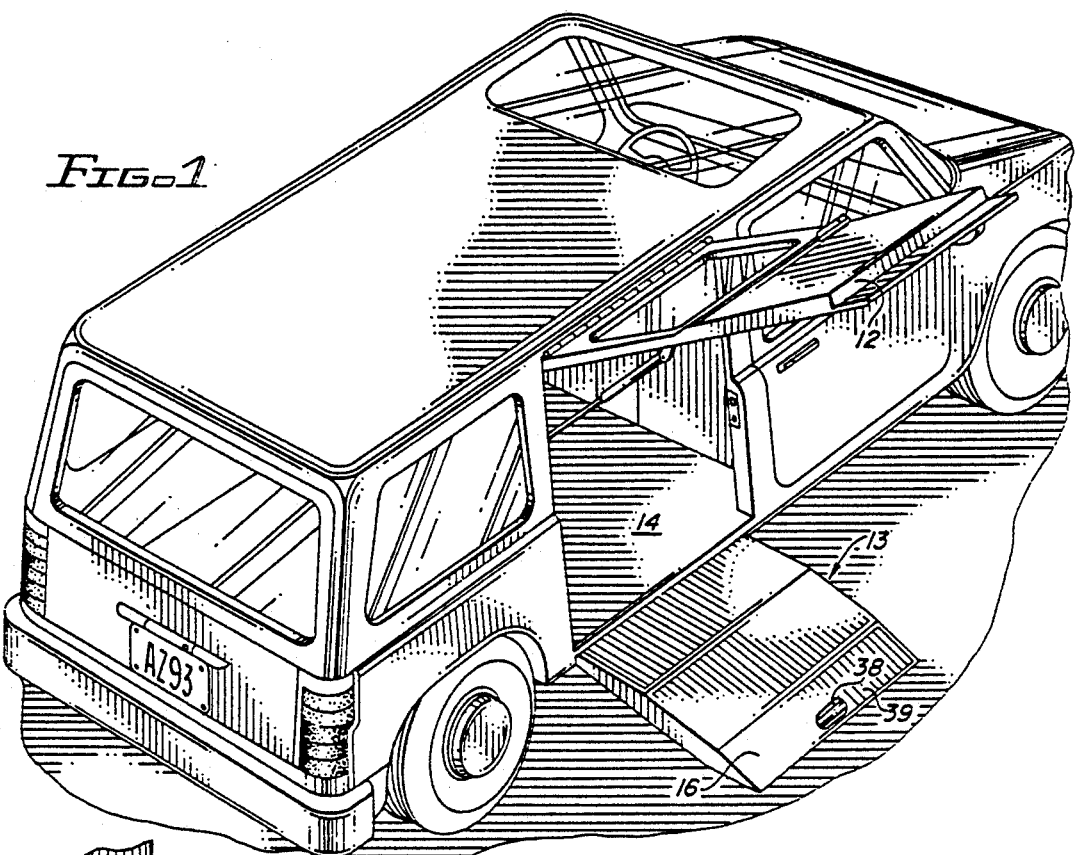
FIG. 1 is a perspective view of a motor vehicle equipped with the boarding system of this invention.

The vehicle 11 illustrated in FIG. 1 is a van equipped with the boarding system of this invention. To admit handicapped persons, such as those confined to wheelchairs, the van is equipped with a large, top opening side door 12 and ramp means 13 providing a slightly inclined walkway from the pavement up to the floor 14 of the van.

The mechanism for powered extension and retraction of ramp means 13 is best illustrated in FIG. 2. Ramp means 13 has two major components, namely, a ramp 16 and a truck structure 17 hingedly connected at 18 to the ramp. Opposite transverse side edges of the truck structure 17 have rollers 19 which ride in guide channels 21. Channels 21 confine the path of movement of truck structure 17 and ramp 16 to a straight line transverse of the van 11.

The outer end regions of the channels 21 are preferably sloped upwardly (see FIG. 4) to elevate the inner edge of ramp 16 to near the level of the floor 14 when the ramp means 13 is extended. With the ramp means 13 in its fully extended position, the ramp 16 is free of the vehicle body and drops down to the pavement. As the ramp means 13 is retracted, the truck structure 17 is guided by channels beneath the floor of the van to the dot and dash line position shown in FIG. 2. During this retracting operation, the under surface of ramp 16 contacts the lip 22 of the opening in the van body and is lifted to a substantially horizontal position for stowage beneath the van floor 14.

Powered movement of ramp means 13 is effected by a linear propelling mechanism identified generally by reference number 23. The propelling mechanism includes an endless band 24 having a linear run 26 which is parallel to the path of movement of ramp means 13. In its preferred construction, band 24 is a roller link chain 27 passing around a sprocket wheel (not shown) in a motor drive transmission 28, through the linear run 26, around an idler sprocket 29, past an adjustable tensioning roller and back to the transmission 28. Transmission 28 has a reversible electric motor 30 associated therewith which is capable of selectively effecting movement of the chain 27 in opposite directions along the linear run 26. Chain movement along run 26 to the right is viewed in FIG. 2 extends, or deploys, ramp means 13 while chain movement to the left retracts and stows the ramp means.

Movement of run 26 of chain 27 is transmitted to the ramp means 13 by releasable connecting means indicated generally by reference numeral 31. Means 31 may also be referred to as a "disconnect mechanism" for selectively connecting and disconnecting chain 27 of the propelling mechanism 23 to the ramp means 13.

Figure 3:
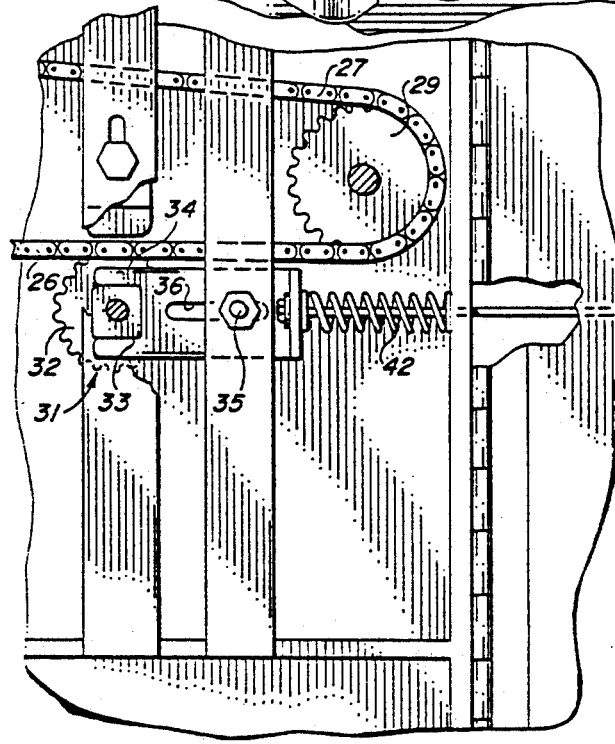
FIG. 3 is an enlarged fragmentary view of the region of FIG. 2 indicated by the dot and dash circle 3 and illustrating one form of the releasable connecting mechanism employed in the invention.
Figure 6:
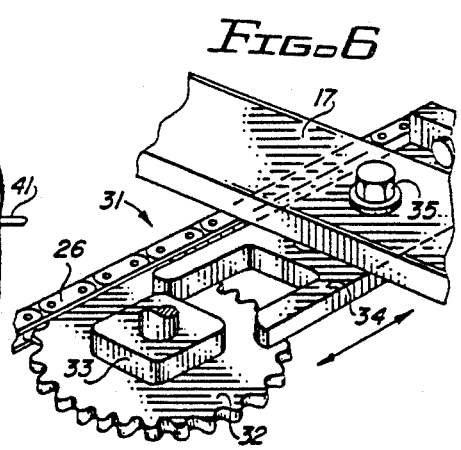
FIG. 6 is an enlarged perspective view of the disconnect mechanism.

The releasable connecting means 31 may take a variety of forms, but one form which is deemed to be particularly effective for the ramp structure of this invention includes a sprocket wheel 32 rotatably carried by the ramp means truck structure 17 in the position in which the sprockets of the wheel mesh with the links of that portion of chain 27 which is in the linear run 26. Sprocket wheel 32 has a non-circular collar, or boss, 33 on one face thereof which is engageable by a slidably mounted locking fork 34 (see FIGS. 3 and 6). A bolt 35 passing through a slot 36 in the locking fork 34 mounts the fork on ramp truck structure 17 in such a manner that the fork can slide into and out of locking engagement with collar 33 on sprocket wheel 32.

It can readily be appreciated that with locking fork 34 in engagement with collar 33, sprocket wheel 32 of the connecting means 31 cannot turn. Consequently, with the connecting means 31 in this condition, any powered movement of chain 27 will effect corresponding movement of the ramp means 13. The truck structure 17 of the ramp means is literally connected to the chain 27 in this condition. In accordance with this invention, however, the ramp means 13 can be disconnected from the chain 27 to permit manual movement of the ramp means in the event the propelling mechanism 23 becomes inoperative as a result of, say, failure of the transmission 28 or the motor 30, or failure of the electrical system of the vehicle to provide electric current to operate the motor.

Disconnecting the ramp means 13 from chain 27 is accomplished by the simple act of withdrawing the locking fork 34 from engagement with the collar 33 on sprocket wheel 32. The sprocket wheel 32 is thus freed to "free-wheel" along the stationary chain 27, offering virtually no resistance to manual movement of the ramp means 13.

Connecting means 31 is preferably manipulated by a handle bar 37 which is accessible through an opening 38 near the outer end 39 of ramp 16 (see FIG. 7). Handle bar 37 is connected to locking fork 34 by a cable 41. By pulling outwardly on handle bar 37, an operator can withdraw locking fork 34 from engagement with collar 33, freeing sprocket wheel 32 for rotation and thereby conditioning ramp means 13 for manual extension and retraction. Upon release of handle bar 37, a compression spring 42 disposed between the locking fork 34 and the truck structure 17 returns the locking fork to its locking position on collar 33.

With the manipulating means, i.e., the handle bar 37, positioned near the outer end 39 of ramp 16, manipulating means is readily accessible regardless of the position of the ramp. By the same token, the ramp system can be restored to powered operation regardless of the position of ramp 16 by the simple act of releasing handle bar 37.

Under powered operation, the direction and extent of movement of ramp means 13 is preferably under control of a pair of contact switches 43 and 44 (see FIG. 2). Switch 43 is positioned to be engaged by a portion of ramp truck structure 17 when the ramp means 13 is fully extended, or deployed. Switch 44 is positioned to be engaged by a portion of ramp truck structure 17 when ramp means 13 is fully retracted, or stowed. Both switches 43 and 44 are wired to de-energize motor 30 and to condition the motor circuit for reverse operation of the motor when engaged by truck structure 17. A separate momentary contact switch (not shown) may be employed to start the motor 30 operating when the ramp means 13 is either in its extended or retracted positions.

It can readily be appreciated that with the motor 30 under control of switches 43 and 44, it is possible to convert the ramp system to powered operation, regardless of the position of the ramp. Take, for example, the situation in which the propelling mechanism 23 becomes inoperative with the ramp in its extended position and the ramp means 13 is manually returned to its retracted, or stowed, position. Contact with switch 44 by the ramp truck structure 17 conditions motor 30 for operation in a direction to extend the ramp means 13 when powered operation is restored.

If powered operation of the ramp means 13 is restored with the ramp means 13 somewhere between its fully extended and fully retracted positions, the ramp means will simply be propelled in the direction for which motor 30 has been conditioned until one of the switches 43 or 44 is contacted.

Figure 8:
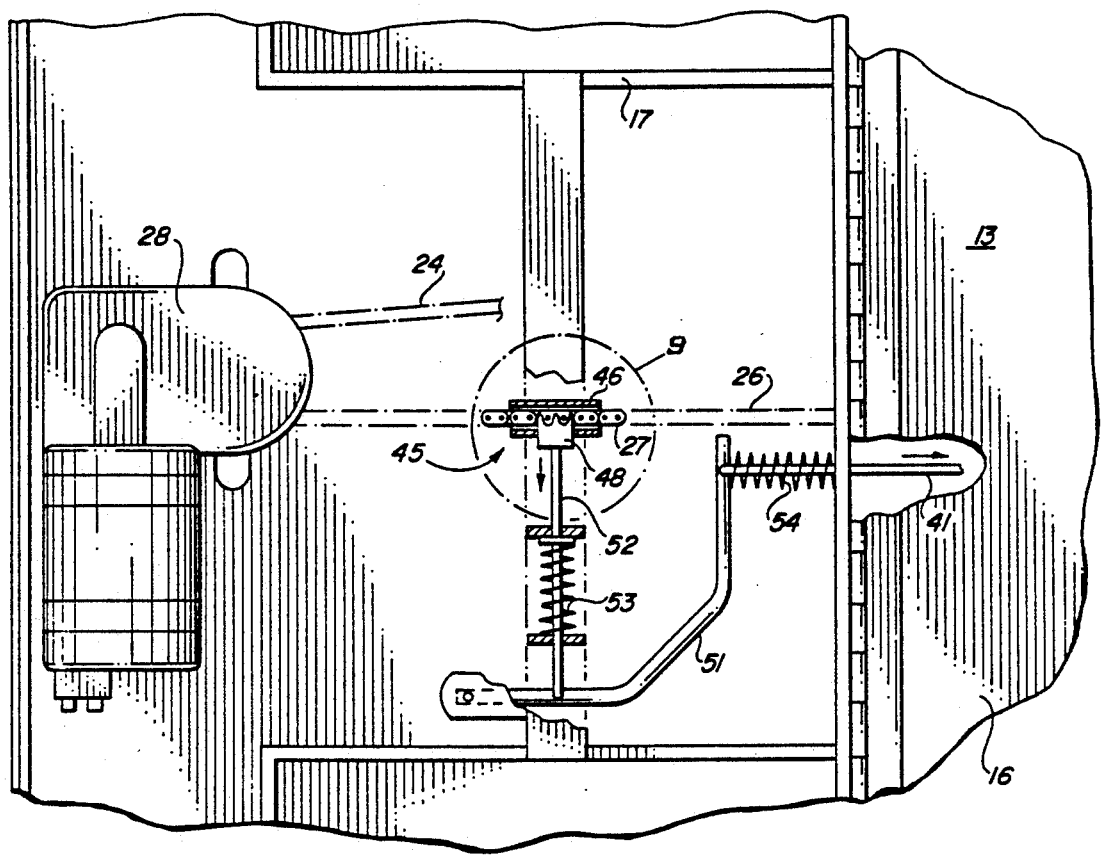
FIG. 8 is a fragmentary plan view of another version of the releasable connecting mechanism employed in the invention.
Figure 9:
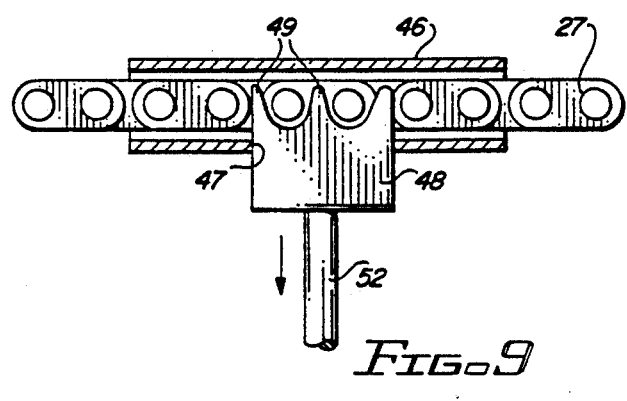
FIG. 9 is an enlarged fragmentary view of the region of FIG. 8 indicated by the dot and dash circle 9.

FIGS. 8 and 9 illustrate another mode for carrying out the invention. Specifically, these figures show a slightly different means for releasably connecting the ramp means to the propelling mechanism. The releasable connecting means is designated generally by reference numeral 45 and components similar to those described previously are indicated by the same reference numerals previously used.

Releasable connecting means 45 is carried by truck structure 17 of the ramp means 13 and cooperates with the linear run 26 of endless band 24. As in the previous embodiment, band 24 is preferably a roller link chain 27 which is propelled by a motor driven transmission 28 for powered operation of the ramp means.

Releasable connecting means 45 includes a sleeve 46 which is rigidly mounted on truck structure 17 in a position to loosely encase a section of the linear run 26 of chain 27. Slidably received in a side wall opening 47 in sleeve 46 is a fork 48, the tines of which function as sprockets 49 to interdigitate with the roller links of chain 27. With the fork 48 in the position shown in FIGS. 8 and 9, sleeve 46 and, consequently, ramp truck structure 17, are locked to chain 27. In this condition, powered propulsion of the chain results in movement of the ramp means 13.

To disconnect ramp means 13 from the powered propelling mechanism to permit manual extension or retraction of the ramp, it is only necessary to retract fork 48 from engagement with the links of chain 27. As in the previously described embodiment, the fork 48 preferably is manipulated by a handle bar (not shown in FIG. 8) at the outer end of ramp 16. The manipulating handle bar is connected to a cable 41 having its opposite end connected to a bell crank 51 which, in turn, manipulates fork 48 through a push-pull rod 52. Helical springs 53 and 54 serve to bias this linkage toward a condition in which fork sprockets 49 are in engagement with the links of chain 27.

From the foregoing, it should be apparent that this invention provides an improved, retractable ramp boarding system for passenger vehicles.

What is claimed is:

1. A vehicle passenger boarding system comprising a vehicle having a floor, a ramp stowable beneath the floor of the vehicle and having an inner end region and an outer end region, said ramp being movable between a retracted position in which the ramp is stowed substantially entirely beneath the floor and an extended position in which the outer end region of the ramp extends outwardly of the vehicle, an endless band having at least one linear run extending parallel to the direction of movement of said ramp, motor means for selectively propelling said band in opposite directions, means for releasably connecting said ramp to said linear run of said band, said ramp when connected to said band being movable by said band between its retracted and extended positions, said ramp when disconnected from said band being manually movable between its retracted and extended positions, and means carried by said outer end region of said ramp for manually manipulating said releasable connecting means.

2. The vehicle boarding system of claim 1, further characterized in that said manipulating means is accessible to an operator when said ramp is in its retracted position and when said ramp is in its extended position.

3. The vehicle boarding system of claim 1, further comprising a first switch engageable by said ramp when in its retracted position and a second switch engageable by said ramp when in its extended position, said first and second switches controlling operation of said motor means to determine the direction in which said band is propelled by said motor means.

4. The vehicle boarding system of claim 1, further characterized in that said releasable connecting means is effective to connect and disconnect said ramp means to and from said band regardless of the position of said ramp.

5. The vehicle boarding system of claim 1, further characterized in that said band is a chain having connected links and said releasable connecting means includes sprockets engageable with the links of the chain.

6. The vehicle boarding system of claim 5, further characterized in that said sprockets are carried on a sprocket wheel and said manipulating means is effective to selectively prevent and permit rotation of said sprocket wheel.

7. A vehicle passenger boarding system comprising a vehicle having a floor, a ramp stowable beneath the vehicle floor and having an inner end region and an outer end region, said ramp being movable between a retracted position in which the ramp is stowed substantially entirely beneath the floor, and an extended position in which the outer end region of the ramp extends outwardly of the vehicle, a linear propelling mechanism having a linear run extending parallel to the path of movement of said ramp, motor means for selectively driving said propelling mechanism in opposite directions, means for releasably connecting said ramp to said propelling mechanism, a first switch engageable by said ramp when in its retracted position, a second switch engageable by said ramp when in its extended position, said first and second switches controlling operation of said motor means to determine the direction in which said propelling mechanism is driven, said ramp when connected to said propelling mechanism being movable by said propelling mechanism between its retracted and extended positions, said ramp means when disconnected from said propelling mechanism being manually movable between its retracted and extended positions, and means carried by said outer end region of said ramp for manually manipulating said releasable connecting means.

8. The vehicle boarding system of claim 7, further characterized in that said releasable connecting means is effective to connect and disconnect said ramp means from said propelling mechanism regardless of the position of said ramp.

9. The vehicle boarding system of claim 7, further characterized in that said manipulating means is accessible to an operator regardless of the position of said ramp means.

* * * * *